United States Patent [19]

Bender et al.

[11] Patent Number: 4,556,170

[45] Date of Patent: Dec. 3, 1985

[54] PNEUMATIC CONTROL SYSTEM

[75] Inventors: Franz Bender, Wendlingen; Klaus Blumensaat, Esslingen-Weil; Wolfgang Bürthel, Waiblingen, all of Fed. Rep. of Germany

[73] Assignee: Daimler-Benz Aktiengesellschaft, Stuttgart, Fed. Rep. of Germany

[21] Appl. No.: 631,066

[22] Filed: Jul. 16, 1984

[30] Foreign Application Priority Data

Jul. 21, 1983 [DE] Fed. Rep. of Germany ....... 3326314

[51] Int. Cl.⁴ .......................................... G05D 23/12
[52] U.S. Cl. ...................................................... 236/86
[58] Field of Search ..................................... 236/86, 87

[56] References Cited

U.S. PATENT DOCUMENTS

| | | | |
|---|---|---|---|
| 3,394,687 | 7/1968 | Scott | 236/86 X |
| 4,247,041 | 1/1981 | Kitamura et al. | 236/87 X |
| 4,352,452 | 10/1982 | Shimada et al. | 236/13 |
| 4,355,681 | 10/1982 | Shimada et al. | 236/13 X |
| 4,362,268 | 12/1982 | Shimada et al. | 236/13 |
| 4,382,546 | 5/1983 | Satomoto | 236/87 X |

Primary Examiner—William E. Tapolcai
Attorney, Agent, or Firm—Barnes & Thornburg

[57] ABSTRACT

A vacuum control system for devices in vehicles is disclosed, such as for controlling air-conditioning and heating equipment. Temperature-sensitive control valves which are inserted in the cooling-water circuit of an internal-combustion engine are automatically operated at a specific temperature to control a pneumatic actuator located vacuum control circuit for the devices.

4 Claims, 3 Drawing Figures

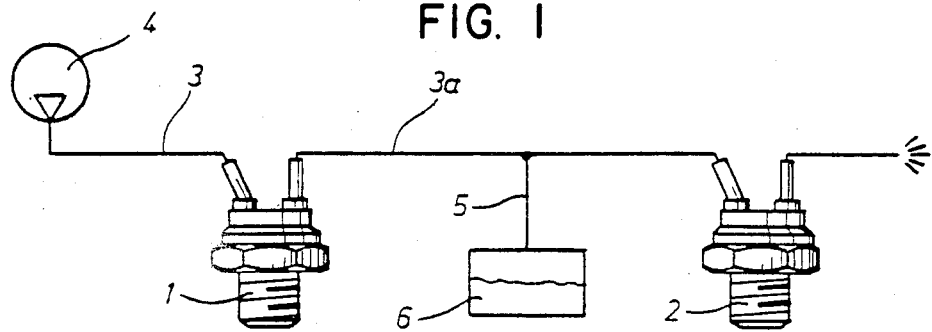
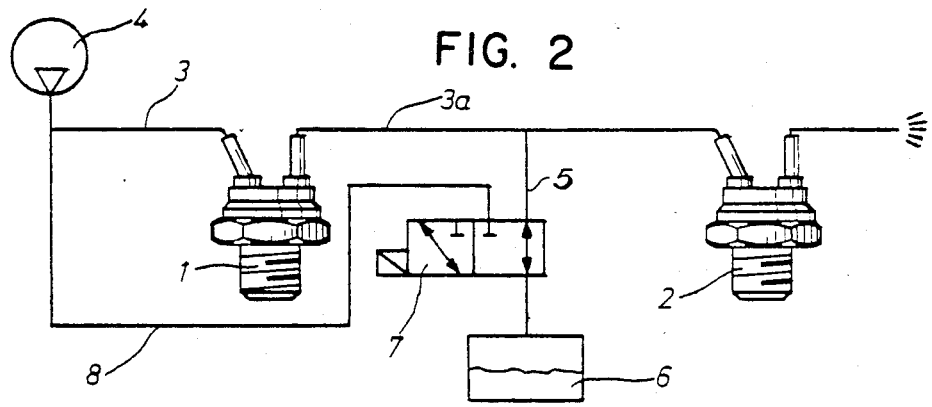
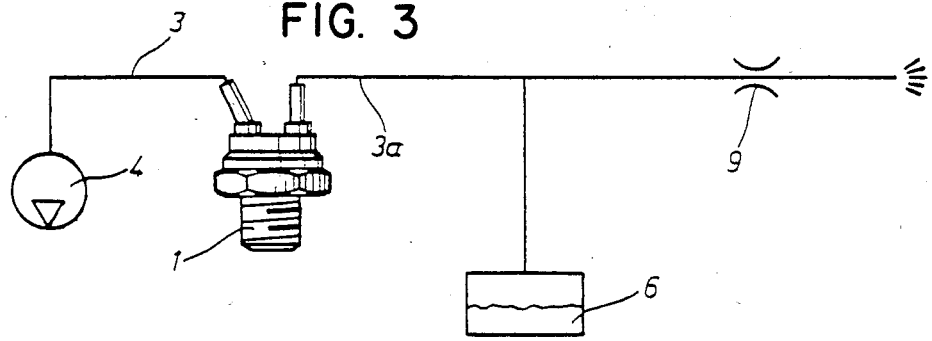

4,556,170

PNEUMATIC CONTROL SYSTEM

BACKGROUND AND SUMMARY OF THE INVENTION

The invention relates to a vacuum control system deployed in a vehicle to control the operation of selected devices such as an air conditioning system or throttle flap. More particularly, this invention relates to a temperature sensitive vacuum control system for controlling actuation of a selected device in response to the variance of the temperature of water or other fluid in a vehicle cooling system.

The November 1976 information pamphlet "Klixon Automotive Valves" distributed by Texas Instruments Holland B.V. makes known thermo-valves as control valves for the control of heating and air-conditioning equipment by means of a vacuum and as a function of the cooling-water temperature. Each thermo-valve consists of a screw-in portion provided with a temperature sensor and of a connector portion with connections for pressure lines. At a specific temperature, communication between the connections is either blocked or opened.

An object of the present invention is to provide a vacuum control system for devices in vehicles which works as precisely as possible and which includes thermo-valves that are activated according to a predetermined cooling-water temperature.

According to the present invention, an apparatus for controlling a selected device within a vehicle includes a vacuum source, a first thermo-valve, a device actuator, and a second thermo-valve. The preceding four elements are sequentially coupled for fluid communication by fluid conduits. The object is achieved due to the fact that the first thermo-valve precedes the device actuator and the second thermo-valve follows the device actuator in the control line. Further, the preceding first thermo-valve is closed and the following second thermo-valve is opened to the atmosphere whenever a selected threshold temperature of the water or other fluid in the vehicle cooling system is reached or surpassed.

The vacuum control of the present invention advantageously ensures direct transmission of control signals to the device actuator. Control of the device with a rapid and simple action is achieved as a result. Further, a vacuum control circuit is much simpler to design than the control circuits of an electrical control system.

Further objects, features, and advantages of the present invention will become more apparent from the following description when taken with the accompanying drawings which show, for purposes of illustration only, several embodiments in accordance with the present invention.

BRIEF DESCRIPTION OF THE DRAWINGS

FIG. 1 is a diagrammatic view of a control apparatus embodying a first preferred embodiment of the present invention including a vacuum source, an actuator, and two thermo-valves for controlling the actuator;

FIG. 2 is a diagrammatic view of a second preferred embodiment of the invention, including the control apparatus of FIG. 1 and a bypass valve for selectably bypassing the first thermo-valve; and FIG. 3 is a diagrammatic view of yet another preferred embodiment of a control apparatus constructed in accordance with the present invention and including a throttle in place of the second thermo-valve.

DETAILED DESCRIPTION OF THE DRAWINGS

The vacuum control system schematically illustrated in FIG. 1, is operable to control air-conditioning or heating equipment or the throttle flap of an internal-combustion engine as a function of a predetermined cooling-water temperature. The vacuum control consists of two thermo-valves 1 and 2, incorporated in the cooling-water circuit, as control valves. Thermo-valves 1 and 2 are connected in series to a vacuum source 4 via control lines 3 and 3a. The actuator 6 is connected via a line part 5 to the control-line portion 3a connecting the two thermo-valves 1 and 2. To control the actuator 6, the thermo-valves 1 and 2 are set so that below the limit temperature to be controlled the thermo-valve 1 preceding the actuator 6 is opened, that is to say the inlet and outlet are connected to one another, whereas the thermo-valve 2 is closed, that is to say the inlet and outlet are separated. In this position, the control is isolated from the atmosphere, so that as a result of the vacuum prevailing in the control line 3 the actuator 6 is displaced into a control position.

When the limit temperature is reached, the thermo-valve 1 interrupts communication between the actuator 6 and the vacuum source 4. At the same time or with a time lag, the thermo-valve 2 opens communication between the inlet and outlet, so that via the outlet connected to the atmosphere the vacuum breaks down and the actuator 6 returns to the initial position.

According to FIG. 2, a three/two-way valve 7 with a flow-through position and a bypass position is incorporated in the line part 5. In the flow-through position illustrated, the actuator 6 is connected to the control line 3a, as in FIG. 1. In the bypass position, the control function of the thermo-valves 1 and 2 is bridged by means of a bypass line 8 leading directly from the valve 7 to the vacuum source 4.

In the exemplary embodiment of FIG. 3, the thermo-valve 2 is replaced by a throttle 9. The throttle 9 is designed here in such a way that, when the thermo-valve 1 opens, a sufficiently high vacuum can still be built up in the control line 3 and 3a to ensure that the actuator 6 moves from its initial position into a control position. Beyond a specific temperature, the thermo-valve 1 closes and the actuator 6 is ventilated. By a suitable choice of the through-flow cross-section of the throttle 9, the actuator 6 can be controlled according to an e-function. This is important for ensuring "soft" transitions between two control positions.

Although the invention has been described in detail with reference to certain preferred embodiments and specific examples, variations and modifications exist within the scope and spirit of the invention as described and defined in the following claims.

What is claimed is:

1. An apparatus for controlling devices, such as an air conditioning system or throttle flap, on vehicles having an engine with a water cooling system, said devices being controlled as a function of the cooling water temperature of the water cooling system, the vehicle having a vacuum source, an actuator which can be subjected to a vacuum via a control line, and at least one thermo-valve located in the cooling-water circuit, the apparatus comprising:

the first thermo-valve and a second thermo-valve, in this order, connected in series via control lines between the vacuum source and the free atmosphere, one of said thermo-valves being a normally-closed valve and the other of said valves being a normally-open valve, an actuator for actuating a device to be controlled, the actuator being connected via a third control line to a branch of the control line connecting the two thermo-valves, and temperature sensitive means for activating the thermo-valves in a complementary manner such that above a specific temperature one of said thermo-valves is closed while the other of said thermo-valves is opened and such that below said specific temperature the open and closed state of said valves is reversed, whereby the actuator is actuated to control the vehicle device.

2. The apparatus of claim 1, further comprising one of an electrically and mechanically switchable three-way valve, the three-way valve connecting the actuator directly to the vacuum source and being inserted in the third control line.

3. An apparatus for controlling a selected system within a vehicle having a fluid system for cooling an engine and a vacuum source having an outlet port, the apparatus comprising:

a first normally-open thermo-valve in thermal communication with a fluid in the fluid system and responsive to a selected threshold temperature of the fluid, the first thermo-valve having an inlet port and an outlet port, a second normally-closed thermo-valve in thermal communication with the fluid in the fluid system and responsive to the selected threshold temperature of the fluid, the second thermo-valve having an inlet port and an outlet port, first means for coupling the outlet port of the vacuum source to the inlet port of the first thermo-valve, second means for coupling the outlet port of the first thermo-valve to the inlet port of the second thermo-valve, means for introducing ambient air to the outlet port of the second thermo-valve, a normally-open actuator for controlling the selected system, the actuator having an inlet port, and third means for coupling the second coupling means to the inlet port of the actuator, whereby exposure of the first and second thermo-valves to fluid temperature in excess of the selected threshold temperature closes the first normally-open thermo-valve and opens the second normally-closed thermo-valve to connect the inlet port of the actuator to the atmosphere to cause the normally-open actuator to return to an initial position, and whereby exposure of the first and second thermo-valves to fluid temperature below the selected threshold temperature opens the first normally-open thermo-valve and closes the second normally-closed thermo-valve to cause the normally-open actuator to be displaced into a control position, thereby controlling the selected system.

4. The apparatus of claim 3, wherein the third coupling means includes a bypass valve for bypassing the first thermo-valve, the bypass valve including a first inlet port, a second inlet port, and an outlet port, fourth means for coupling the outlet port of the vacuum source to the first inlet port of the bypass valve, fifth means for coupling the second coupling means to the second inlet port of the bypass valve, sixth means for coupling the outlet port of the bypass valve to the inlet port of the actuator, and switch means for selectively connecting the sixth coupling means to one of the fourth coupling means to disable the first thermo-valve and the fifth coupling means to enable the first thermo-valve.

* * * * *